(12) United States Patent
Tessien (10) Patent No.: US 7,571,531 B2
(45) Date of Patent: *Aug. 11, 2009

(54) METHOD OF FABRICATING A SPHERICAL CAVITATION CHAMBER UTILIZING ELECTRON BEAM WELDING

(75) Inventor: Ross Alan Tessien, Nevada City, CA (US)

(73) Assignee: Impulse Devices, Inc., Grass Valley, CA (US)

( * ) Notice: Subject to any disclaimer, the term of this patent is extended or adjusted under 35 U.S.C. 154(b) by 446 days.

This patent is subject to a terminal disclaimer.

(21) Appl. No.: 11/493,302

(22) Filed: Jul. 26, 2006

(65) Prior Publication Data

US 2006/0260113 A1 Nov. 23, 2006

Related U.S. Application Data

(63) Continuation-in-part of application No. 10/925,070, filed on Aug. 23, 2004, now Pat. No. 7,103,956.

(51) Int. Cl.
*B21D 39/02* (2006.01)
*G21B 1/03* (2006.01)

(52) U.S. Cl. ............................. 29/463; 29/557; 29/558; 29/559; 408/1 R; 82/1.11; 82/47; 228/141.1; 228/164; 228/170; 228/171

(58) Field of Classification Search .................. 29/463, 29/464, 466, 557, 558, 559; 366/165.1, 165.2, 366/162.4, 174.1; 376/100, 102; 408/1 R; 82/1.11, 47; 228/141.1, 164, 170, 171
See application file for complete search history.

(56) References Cited

U.S. PATENT DOCUMENTS 2,113,060 A 4/1938 Sandberg (Continued)

FOREIGN PATENT DOCUMENTS

DE 2847943 B 10/1979

(Continued)

OTHER PUBLICATIONS

Blake et al., Acoustic Cavitation:The Fluid Dynamics of Non-Spherical Bubbles, Phil. Trans. R. Soc. Lond. A, 1999, pp. 251-267, vol. 357, Publisher: The Royal Society, Published in: Great Britain.

(Continued)

*Primary Examiner*—Essama Omgba
(74) *Attorney, Agent, or Firm*—C. Brandon Browning; Maynard Cooper & Gale, PC (57) ABSTRACT

A method of fabricating a spherical cavitation. Depending upon the chamber's composition and wall thickness, chambers fabricated with the disclosed techniques can be used with either low or high pressure systems. During chamber fabrication, initially two spherical half portions are fabricated and then the two half portions are joined together to form the desired cavitation chamber. During the fabrication of each chamber half, the interior spherical surface is completed first and then the outer spherical surface. Prior to joining the two spherical cavitation chamber halves, the surfaces to be mated are finished, preferably to a surface flatness of at least 0.01 inches. Electron beam welding is used to join the chamber halves together. Preferably the electron beam welding operation is performed under vacuum conditions. During electron beam welding, the two chamber halves are aligned and held together while the electron beam forms a weld along the chamber seam.

26 Claims, 7 Drawing Sheets

U.S. PATENT DOCUMENTS

| | | | |
|---|---|---|---|
| 2,118,388 A | 5/1938 | Zerbe | |
| 2,451,099 A | 10/1948 | La Motte | |
| 2,763,699 A | 9/1956 | Van Dijk et al. | |
| 3,050,207 A | 8/1962 | Rolfe | |
| 3,186,271 A | 6/1965 | Fritz | |
| 3,291,456 A | 12/1966 | Deane | |
| 3,306,587 A | 2/1967 | Schroedter | |
| 3,522,647 A | 8/1970 | Holcomb et al. | |
| 3,599,307 A | 8/1971 | Campbell et al. | |
| 3,762,448 A * | 10/1973 | Donohue | 138/171 |
| 3,767,890 A | 10/1973 | Madden, Jr. | |
| 3,772,750 A | 11/1973 | Hauser | |
| 4,333,796 A | 6/1982 | Flynn | |
| 4,448,743 A | 5/1984 | Bass | |
| 4,563,341 A | 1/1986 | Flynn | |
| 4,835,359 A | 5/1989 | Sciortino | |
| 5,659,173 A | 8/1997 | Putterman et al. | |
| 5,659,956 A | 8/1997 | Braginsky et al. | |
| 5,858,104 A | 1/1999 | Clark | |
| 6,361,747 B1 | 3/2002 | Dion et al. | |
| 6,662,427 B2 | 12/2003 | Miyahara | |
| 7,103,956 B2 * | 9/2006 | Tessien | 29/463 |
| 2008/0122153 A1 * | 5/2008 | Yoshioka et al. | 269/50 |

FOREIGN PATENT DOCUMENTS

| | | | |
|---|---|---|---|
| GB | 2084064 A | | 4/1982 |
| JP | 58159940 A | * | 9/1983 |
| SE | 8205899 A | | 5/1984 |
| SU | 1175609 A | | 8/1985 |
| WO | WO 01/39197 | | 5/2001 |

OTHER PUBLICATIONS

Dan et al, Ambient Pressure Effect on Single-Bubble Sonoluminescence, Physical Review Letters, Aug. 30, 1999, pp. 1870-1873, vol. 83, No. 9, Published in: US.

Moss et al., Computed Optical Emissions from a Sonoluminescing Bubble, Physical Review E, Mar. 1999, pp. 2986-2992, vol. 59, No. 3, Published in: US.

Gaitan et al., Experimental Observations of Bubble Response and Light Intensity Near the Threshold for Single Bubble Sonoluminescence, Physical Review E, May 1999, pp. 5495-5502, vol. 59, No. 5, Published in: US.

Barber et al, Sensitivity of Sonoluminescence to Experimental Parameters, Physical Review Letters, Feb. 28, 1994, pp. 1380-1382, vol. 72, No. 9.

Putterman, Sonoluminescence:Sound Into Light, Scientific American, Feb. 1995, pp. 46-51.

Gaitan et al, Sonoluminescence and Bubble Dynamics for a Single, Stable, Cavitation Bubble, J. Acoust. Soc. Am., Jun. 1992, pp. 3166-3183, vol. 91, No. 6.

Crum, Sonoluminescence, Physics Today, Sep. 1994, pp. 22-29.

Bollinger, Ultra Cavitation, http://wiretap.area.com/Gopher/Library/Article/Sci/cavitate.ult, Sep. 17, 2001, pp. 1-26.

* cited by examiner

METHOD OF FABRICATING A SPHERICAL CAVITATION CHAMBER UTILIZING ELECTRON BEAM WELDING

REFERENCE TO RELATED APPLICATIONS

This application is a continuation-in-part of patent application Ser. No. 10/925,070 filed Aug. 23, 2004 which was issued as U.S. Pat. No. 7,103,956 on Sep. 12, 2006.

FIELD OF THE INVENTION

The present invention relates generally to sonoluminescence and, more particularly, to a method of fabricating a sonoluminescence cavitation chamber.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to not only completely characterize the phenomena (e.g., effects of pressure on the cavitating medium), but also its many applications (e.g., sonochemistry, chemical detoxification, ultrasonic cleaning, etc.). A by-product of this research have been several patents claiming various aspects of the process. One such patent, U.S. Pat. No. 4,333,796, discloses a cavitation chamber that is generally cylindrical although the inventors note that other shapes, such as spherical, can also be used. It is further disclosed that the chamber is comprised of a refractory metal such as tungsten, titanium, molybdenum, rhenium or some alloy thereof. U.S. Pat. No. 4,333,796 does not disclose any techniques for fabricating the chamber. Similarly U.S. Pat. No. 4,563,341, a continuation-in-part of U.S. Pat. No. 4,333,796, does not disclose fabrication techniques for use with the disclosed cylindrical chamber. Rather, the patent simply discloses the preferred materials for the chamber walls and chamber linings and the preferred mounting locations for an array of acoustic horns.

U.S. Pat. No. 5,659,173 discloses a sonoluminescence system that uses a transparent spherical flask. The spherical flask is not described in detail, although the specification discloses that flasks of Pyrex®, Kontes®, and glass were used with sizes ranging from 10 milliliters to 5 liters.

U.S. Pat. No. 5,858,104 discloses a shock wave chamber partially filled with a liquid. The remaining portion of the chamber is filled with gas which can be pressurized by a connected pressure source. Acoustic transducers mounted in the sidewalls of the chamber are used to position an object within the chamber. Another transducer mounted in the chamber wall delivers a compressional acoustic shock wave into the liquid. A flexible membrane separating the liquid from the gas reflects the compressional shock wave as a dilation wave focused on the location of the object about which a bubble is formed. The shape, composition and fabrication of the shock wave chamber is not disclosed.

U.S. Pat. No. 6,361,747 discloses an acoustic cavitation reactor. The reactor chamber is comprised of a flexible tube through which the liquid to be treated circulates. The acoustic transducers are radially distributed around the tube. As disclosed, the reactor tube may be comprised of a non-resonant material such as a resistant polymeric material (e.g., TFE, PTFE), with or without reinforcement (e.g., fiberglass, graphite fibers, mica).

Although not in the field of sonoluminescence, U.S. Pat. No. 4,448,743 discloses a confinement chamber for use with an ultra-high temperature steady-state plasma. Although the plasma is referred to as a "plasmasphere", the specification is unclear as to whether the confinement chamber is spherical or cylindrical in nature. Furthermore a method of fabricating the disclosed chamber is not provided. Rather, the patent simply discloses the design requirements for such a chamber. For example, in describing the requirements for an isochoric heating system, the patent discloses that the vessel should be capable of containing a pressure that is slowly increased from 1.82 atmospheres to 22.1 atmospheres and be fitted with infrared and far-infrared windows as well as a down-draft vertical hydrogen jet.

Although a variety of sonoluminescence systems have been designed, typically these systems are intended for low pressure research and therefore are comprised of glass or similar material. Those designed for higher pressures are usually cylindrically shaped. Those researchers who have suggested the use of spherical chambers have not disclosed how to fabricate such a chamber to enable it to handle high pressure. Accordingly, what is needed is a method of fabricating a spherical cavitation chamber that can be used for high pressure sonoluminescence. The present invention provides such a method.

SUMMARY OF THE INVENTION

The present invention provides a method of fabricating a spherical cavitation chamber for sonoluminescence. Depending upon both the chamber's composition and wall thickness, chambers fabricated with the disclosed techniques can be used with either low or high pressure systems.

According to the invention, chamber half portions are first fabricated and then the two half portions are joined together to form the desired cavitation chamber. According to one embodiment, during the fabrication of each chamber half, the interior surface, the mating surface and a portion of the exterior surface are fabricated while the piece of stock is mounted within a first lathe chuck. The stock piece is then un-mounted, reversed, and mounted within a second lathe chuck. The second lathe chuck may be the same as the first lathe chuck, or the second lathe chuck may have jaws with holding surfaces which match the curvature of the exterior surface of the chamber half. Once mounted within the second lathe chuck, the remaining portion of the exterior surface is turned. According to a second embodiment, during the fabrication of each chamber half the interior spherical surface is completed first along with a cylindrical portion. The stock piece is then un-mounted, reversed, and remounted prior to turning the exterior spherical surface. The cylindrical portion is then removed and the mating surface finished.

According to another aspect of the invention, joining the cavitation chamber halves together is accomplished via electron beam welding. Prior to welding, the two half spheres are aligned and held together. Preferably one or more alignment pins are used to insure accurate alignment of the two halves. Alternately external alignment means can be used. During the electron beam welding process, either the chamber comprised of the two chamber halves is rotated relative to the stationary electron beam or the electron beam is rotated about the chamber.

In at least one embodiment of the invention, the cavitation chamber is fabricated from stainless steel.

In at least one embodiment of the invention, after the cavitation chamber is finished, at least one acoustic transducer is coupled to the chamber in order to drive sonoluminescence within the chamber.

A further understanding of the nature and advantages of the present invention may be realized by reference to the remaining portions of the specification and the drawings.

DESCRIPTION OF THE SPECIFIC EMBODIMENTS

Figure 1:
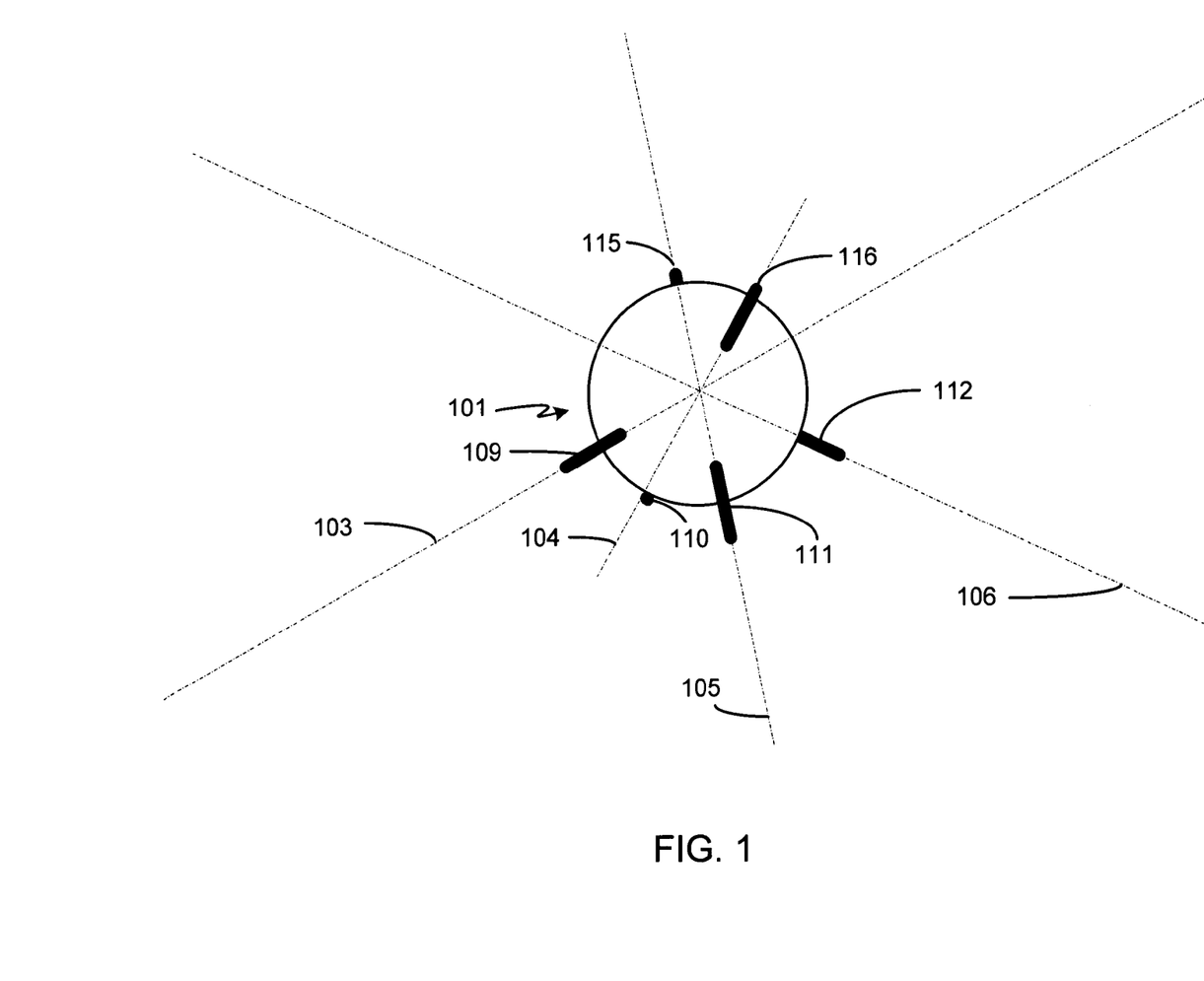
FIG. 1 is an illustration of a spherical sonoluminescence cavitation chamber fabricated in accordance with the invention.

FIG. 1 is an illustration of a spherical sonoluminescence cavitation chamber 101, hereafter referred to as simply a cavitation chamber, fabricated in accordance with the invention. In order to better illustrate the mounting locations of the acoustic transducers in this particular embodiment, FIG. 1 includes centerlines 103-106. Mounted to the exterior surface of cavitation chamber 101 are a total of 6 acoustic transducers, transducers 109-112 mounted to the lower hemisphere of chamber 101 and transducers 115-116 mounted to the upper hemisphere of chamber 101. It will be appreciated that the invention is not limited to a particular number or type of transducer, nor is the invention limited to having transducers mounted to one or more particular locations.

Figure 2:
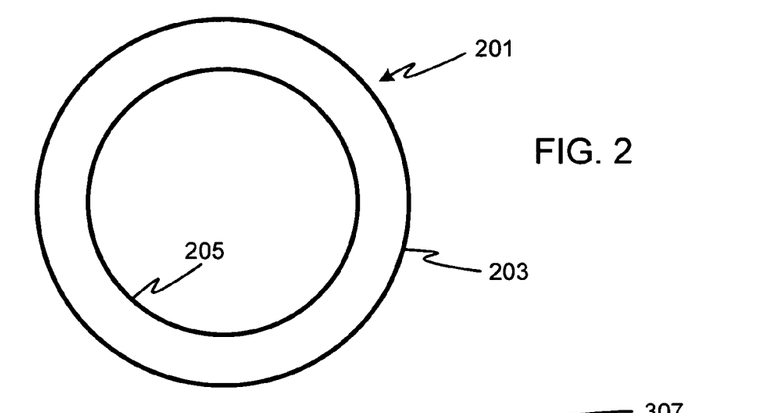
FIG. 2 is a cross-sectional view of a spherical cavitation chamber fabricated in accordance with the invention.

FIG. 2 is a cross-sectional view of a spherical cavitation chamber 201 fabricated in accordance with the invention. Chamber 201 has an outer spherical surface 203 defining the outer diameter of the chamber and an inner spherical surface 205 defining the inner diameter of the chamber.

Chamber 201 can be fabricated from any of a variety of metals although there are some constraints placed on the chamber material. First, the material should be machinable. Second, if the chamber is to be operated at a high temperature, the chamber material should have a relatively high melting temperature. Additionally, a high melting temperature is useful during the fabrication process when the two halves of the chamber are coupled. Third, the chamber material should be corrosion resistant, thus allowing the chamber to be used repeatedly. Fourth, the material should be hard enough to allow a good surface finish to be obtained. In the preferred embodiment of the invention, the chamber is fabricated from 17-4 precipitation hardened stainless steel.

With respect to the dimensions of the chamber, both inner and outer diameters, the selected sizes depend upon the intended use of the chamber. For example, smaller chambers are typically preferable for situations in which it is desirable to limit the amount of cavitating medium, for example due to cost, or the applied energy (e.g., acoustic energy). On the other hand large chambers, on the order of 8-10 inches or greater, typically simplify experimental set-up and event observation. Thick chamber walls are preferable if the chamber is to be operated at high static pressures. Although the invention is not limited to specific dimensions as previously noted, typical wall thicknesses include 0.25 inches, 0.5 inches, 0.75 inches, 1.5 inches, 2.375 inches, 3.5 inches and 4 inches. Typical outside diameters are in the range of 2-10 inches although, as previously noted, much larger diameters can be used.

Figure 3:
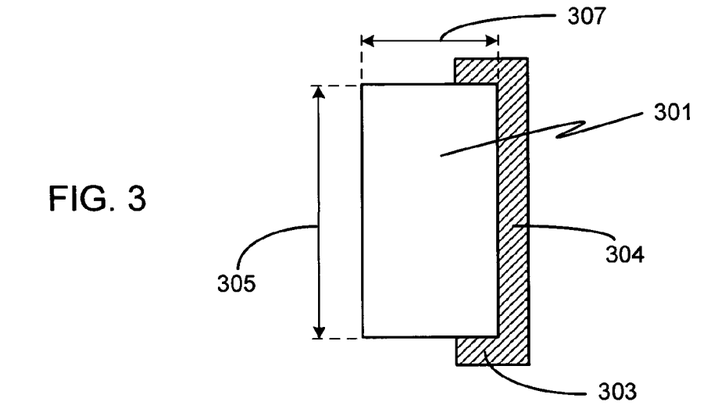
FIG. 3 illustrates the first step of chamber fabrication in which a piece of stock material is mounted within a lathe chuck.

The preferred embodiment of the invention provides a means of fabricating spherical chambers while at the same time minimizing wasted material, and thus cost. The first step in the preferred method is to mount a piece 301 of the desired material into jaws 303 of lathe chuck assembly 304. The diameter 305 of piece 301 is preferably only slightly larger than the desired chamber outer diameter, typically on the order of 0.125 to 0.25 inches greater. Similarly, the length 307 is preferably only slightly larger than one half of the desired chamber outer diameter.

Figure 4:
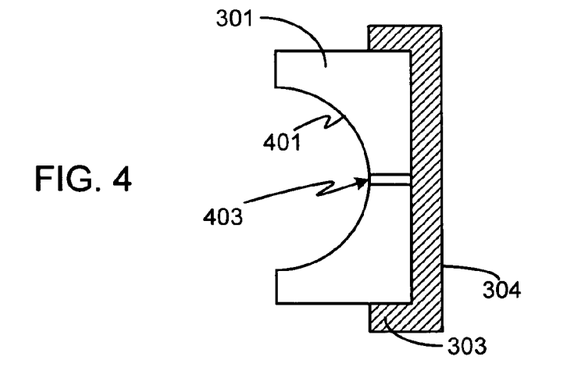
FIG. 4 illustrates the step in which the inside surface of a spherical chamber half is fabricated.
Figure 5:
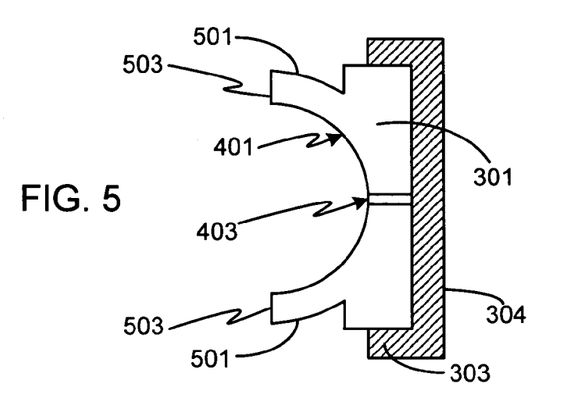
FIG. 5 illustrates the step in which a portion of the outside surface of the chamber half of FIG. 4 is fabricated.

As illustrated in FIG. 4, the inside spherical surface 401 is then fabricated (i.e., turned) to the desired diameter using the lathe. If desired, a through-hole 403 can be bored into piece 301 at this time. Next, without removing piece 301 from the lathe chuck, a portion 501 of the outer spherical surface is turned (FIG. 5). Additionally surface 503 is turned while piece 301 is mounted within chuck assembly 304.

Figure 6:
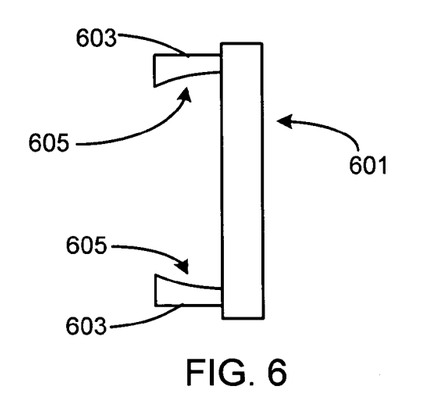
FIG. 6 is a cross-sectional view of a chuck assembly in which the jaws are shaped to match the curvature of the outside surface of the chamber half shown in FIG. 5.
Figure 7:
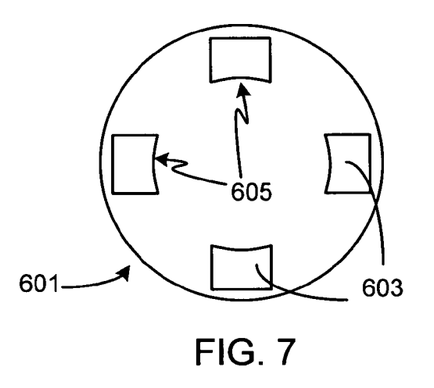
FIG. 7 is an end-view of the chuck assembly of FIG. 6.

FIGS. 6 and 7 illustrate the preferred jaw assembly used during the next phase of chamber fabrication. FIG. 6 is a cross-sectional view of lathe chuck assembly 601 and FIG. 7 is an end view of chuck assembly 601. Although chuck assembly 601 is shown with 4 jaws 603, it will be appreciated that chuck assembly 601 could have fewer jaws (e.g., a 3 jaw chuck) or more jaws (e.g., a 6 jaw chuck). Holding surfaces 605 of jaws 603 are shaped such that they have a curvature that matches the curvature of surface 501 of piece 301. Curving the surfaces of jaws 603 provides a large contact area between jaws 603 and surface 501, thus spreading out the force applied to the chamber by the jaws. As a result, thinner wall thicknesses can be achieved without deforming the chamber walls, a result that is difficult to achieve using standard, straight-faced jaws. Additionally this approach provides a stronger mounting configuration, thus preventing piece 301 from being pulled out of chuck assembly 601, or moving within chuck assembly 601, during the final fabrication of the outer surface of the spherical chamber. It will be appreciated that if piece 301 moves within the chuck assembly even by a minor amount, the finished chamber half will not have the preferred inside/outside spherical symmetry.

Figure 8:
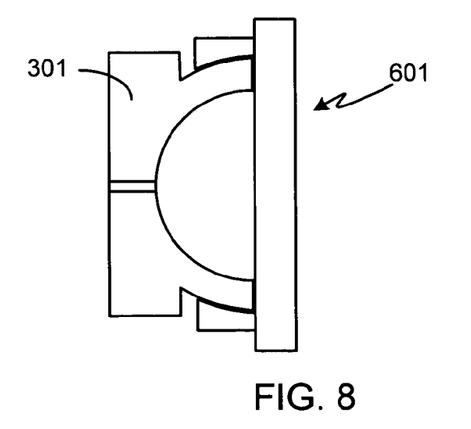
FIG. 8 illustrates the chamber half of FIG. 5 mounted within the chuck assembly of FIGS. 6 and 7.
Figure 9:
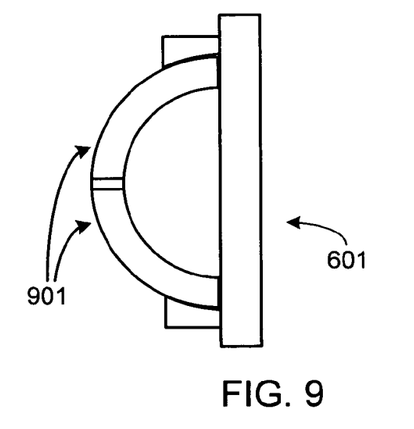
FIG. 9 illustrates the step in which the last remaining portion of the spherical chamber half of FIG. 4 is fabricated.

FIG. 8 illustrates piece 301 mounted in chuck assembly 601. During the final step of fabricating this spherical cavitation chamber half, surface 901 is turned as shown in FIG. 9.

Prior to chamber assembly, chamber surface 503 is finished flat. Assuming a chamber outside diameter of 10 inches or less, surface 503 is finished flat to within at least ±0.01 inches, preferably within ±0.001 inches, and still more preferably within ±0.0005 inches. For diameters greater than 10 inches, the inventor has found that as a general rule, the finish surfaces previously noted are multiplied by a tenth of desired chamber's outside diameter (in inches). Thus for example, assuming a desired chamber diameter of 30 inches, the end surface would be finished flat to within at least ±0.03 inches, preferably within ±0.003 inches, and still more preferably within ±0.0015 inches.

Figure 10:
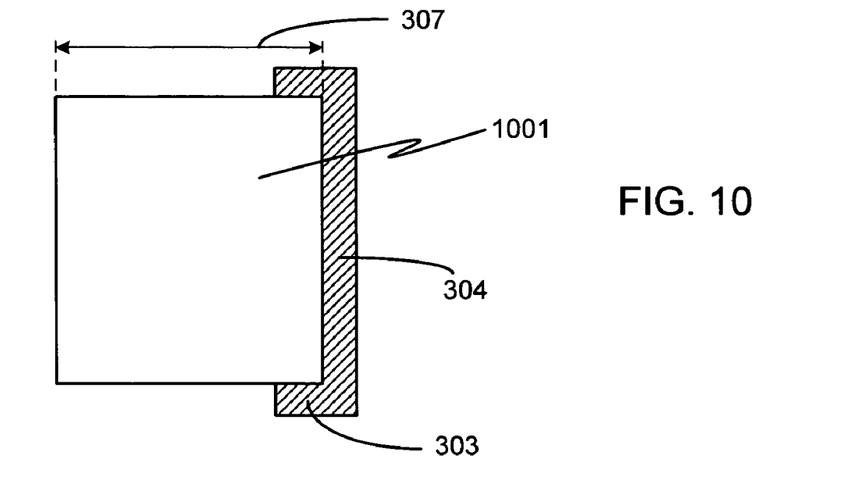
FIG. 10 illustrates the mounting of a larger stock piece in the lathe chuck assembly in accordance with a second embodiment of the invention.
Figure 11:
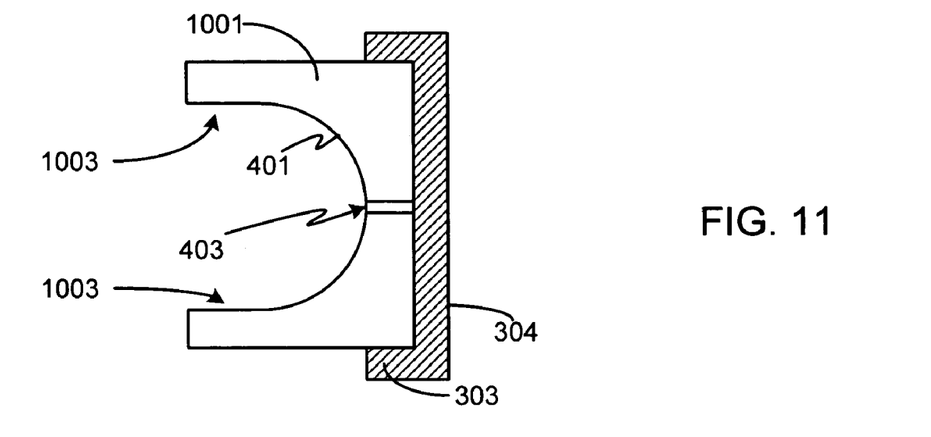
FIG. 11 illustrates the step in which the inside surface of a spherical chamber half and a cylindrical portion are fabricated in accordance with the second embodiment.

Although preferably the spherical chamber halves are fabricated as disclosed above, it will be understood that the inventor also envisions minor variations of this fabrication technique. For example as illustrated in FIG. 10, dimension 307 of a stock piece 1001 can be larger than noted above with respect to FIG. 3. Then during the initial fabrication step (FIG. 11), a cylindrical portion 1003 is turned as well as inside spherical surface 401.

Figure 12:
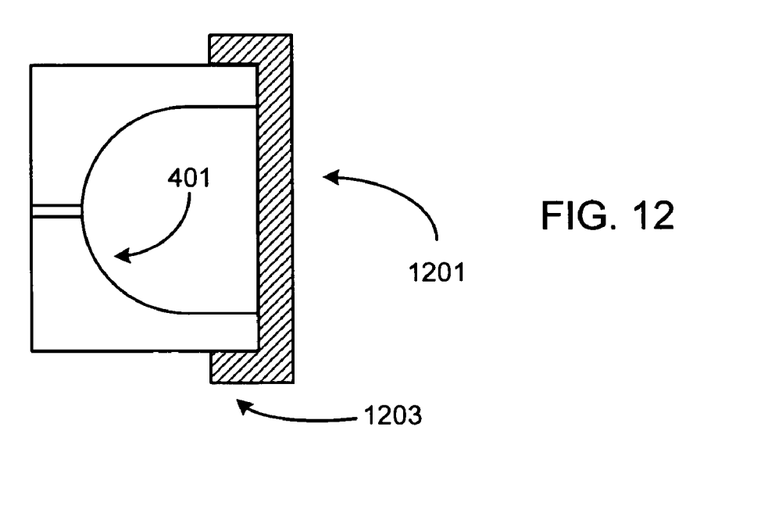
FIG. 12 illustrates the step of reversing the mounting configuration of the spherical chamber half in accordance with the second embodiment.
Figure 13:
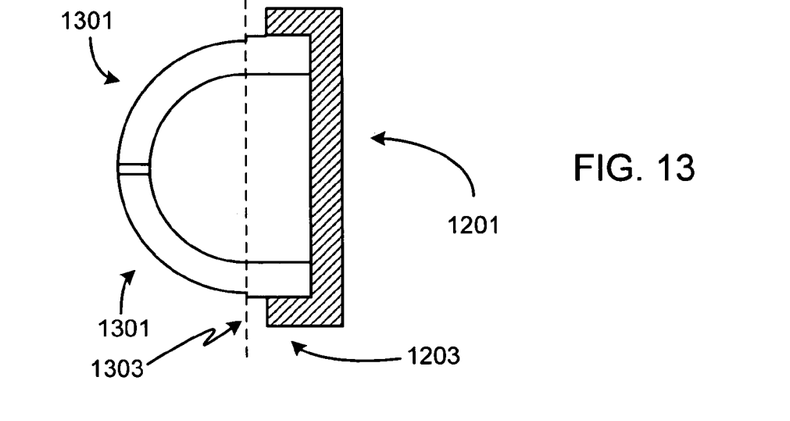
FIG. 13 illustrates the step in which the outside surface of the spherical chamber half of FIG. 11 is fabricated in accordance with the second embodiment.

Next, as illustrated in FIG. 12, piece 1001 is removed from chuck assembly 304, reversed, and mounted within chuck assembly 1201. Chuck assembly 1201 may be the same as chuck assembly 304 or may be different, for example having jaws 1203 which have the same curvature as that of cylindrical portion 1003. The outside spherical surface 1301 is then fabricated (i.e., turned) as shown in FIG. 13. If desired, at this point through-hole external features (i.e., pipe threads) can be added.

After turning outside surface 1301, the spherical chamber half is removed from cylindrical portion 1003 along line 1303. Assuming a chamber outside diameter of 10 inches or less, the end surface of the chamber half is then finished flat to within at least ±0.01 inches, preferably within ±0.001 inches, and still more preferably within ±0.0005 inches. For diameters greater than 10 inches, the inventor has found that as a general rule, the finish surfaces previously noted are multiplied by a tenth of desired chamber's outside diameter (in inches). Thus for example, assuming a desired chamber diameter of 30 inches, the end surface would be finished flat to within at least ±0.03 inches, preferably within ±0.003 inches, and still more preferably within ±0.0015 inches.

In the preferred embodiment of the invention, the inner and outer spherical chamber surfaces are used as turned. It will be appreciated, however, that various surface finishing procedures (e.g., surface grinding or polishing) can be performed on either or both surfaces if desired.

Figure 14:
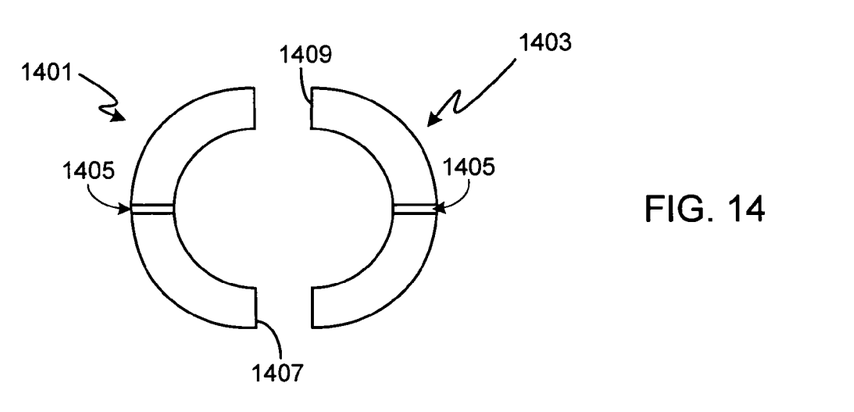
FIG. 14 illustrates a pair of spherical chamber halves.

Regardless of the exact method of fabricating the spherical chamber halves, the next step is to join two halves to form the desired cavitation chamber. As shown in FIG. 14, spherical chamber halves 1401 and 1403 are ready to be joined. As illustrated, chamber halves 1401 and 1403 each include a through-hole 1405 although, as previously described, one or both chamber halves can include any number of through-holes or ports (including no through-holes or ports). Preferably any desired through-holes or ports are completed prior to joining the chamber halves, thus insuring that the inner surfaces are finished and cleaned, a process that is more difficult after the chamber halves have been joined.

After the surfaces to be mated, surfaces 1405 and 1407, are finished as previously described, they are ready to be joined, preferably using an electron beam welding operation. Electron beam welding provides a strong joint between the chamber halves that is capable of withstanding the high pressures often encountered during cavitation system operation.

During the electron beam welding operation, the mating surfaces of spherical cavitation chamber halves 1401 and 1403 are aligned and pressed together. Then either the electron beam is rotated about the chamber in order to weld together mating surfaces 1405 and 1407 or, as preferred, the chamber comprised of the two chamber halves is rotated relative to the stationary electron beam. Although the actual welding operation can be performed under low vacuum and non-vacuum conditions using techniques known by those of skill in the electron beam welding arts, preferably the welding operation is performed under high vacuum conditions, thus achieving optimal weld purity and depth. If the welding process is performed under vacuum conditions, for example within an evacuated welding chamber, at least one through-hole 1405 must be included in at least one of the chamber halves to allow pressure relief/equalization.

Figure 15:
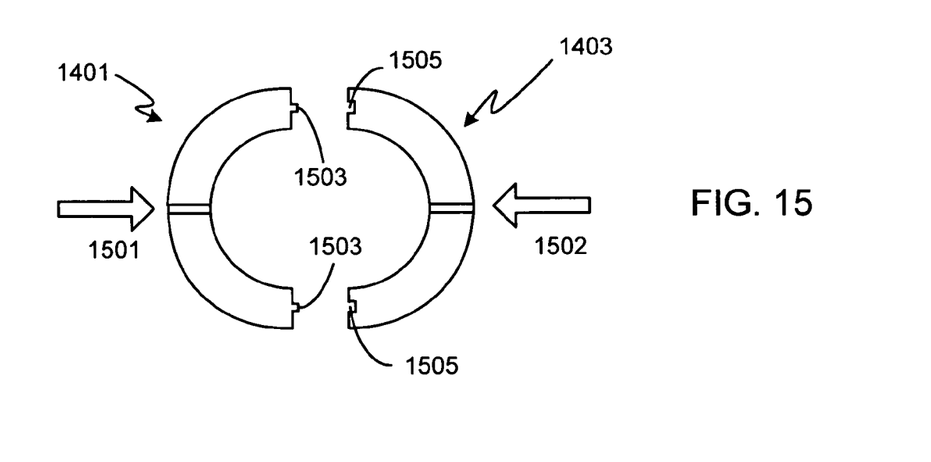
FIG. 15 illustrates the step of aligning two cavitation chamber halves, the halves including alignment means.

During the welding process, spherical cavitation chamber halves 1401 and 1403 are aligned to insure that the inner sphere surface does not have a discontinuity at the seam line after fabrication. One process for insuring alignment is to use a lip 1503 on one chamber half that fits within a groove 1505 on the second chamber half as shown in FIG. 15. Alternately one of the mating surfaces can include two or more alignment pins that correspond to holes on the other mating surface. If alignment pins are used, preferably they are fabricated from the same material as that of the spherical chamber halves.

Figure 16:
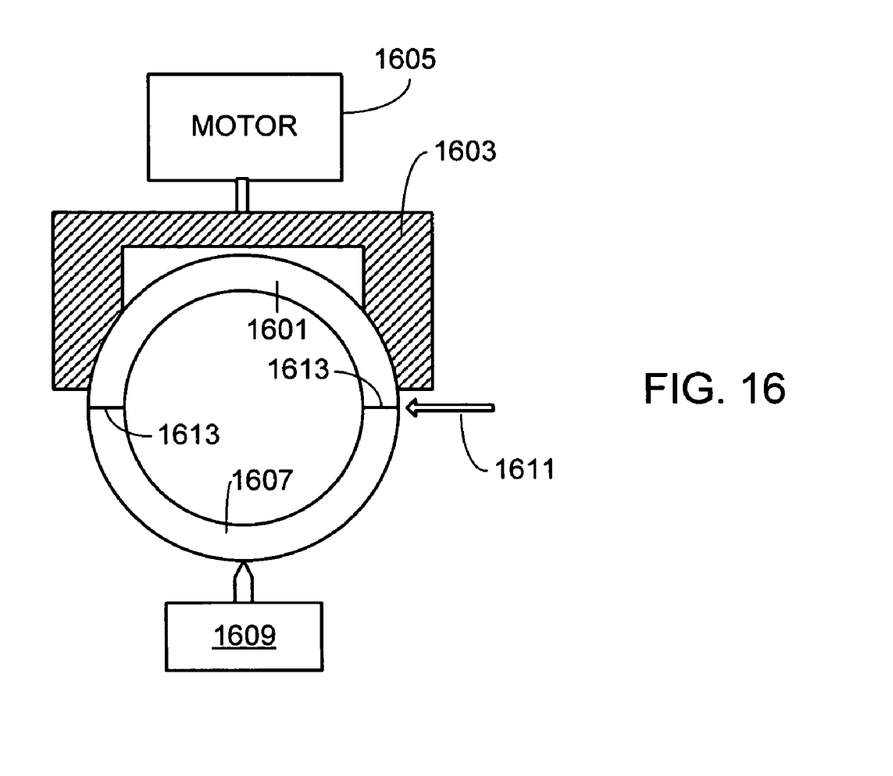
FIG. 16 illustrates a welding jig in which the chamber is rotated relative to the electron beam.
Figure 17:
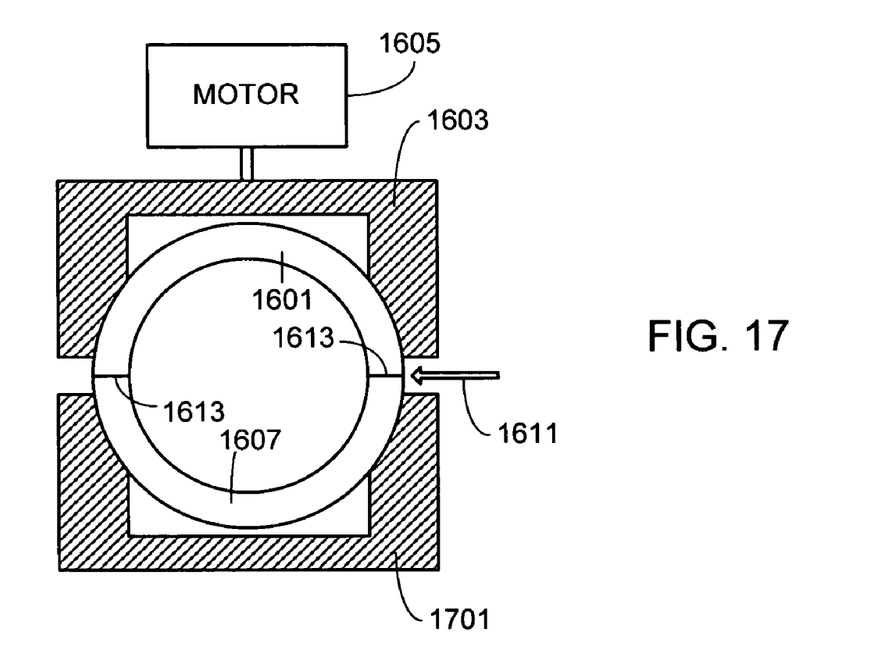
FIG. 17 illustrates an alternate welding jig in which the chamber is rotated relative to the electron beam.
Figure 18:
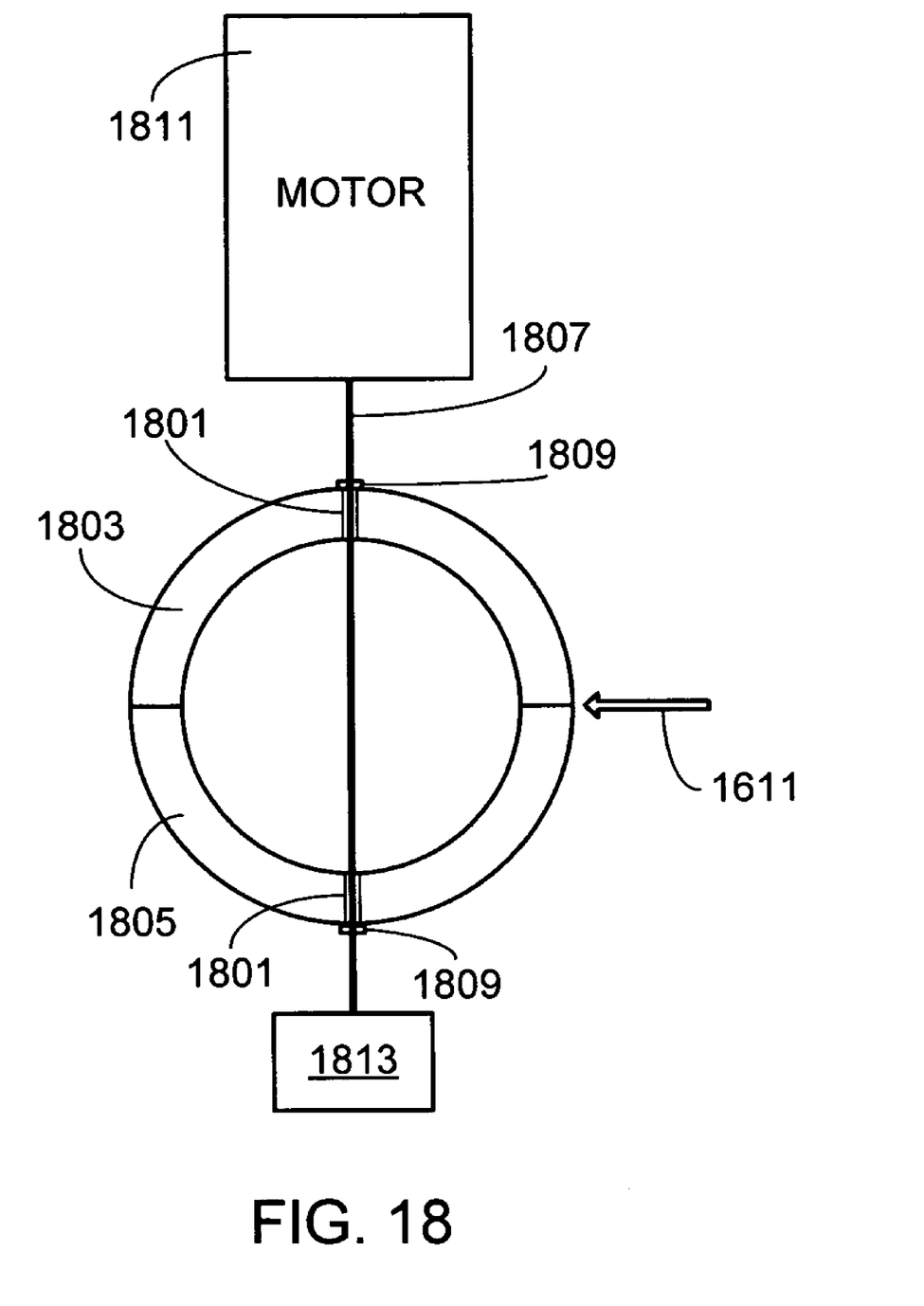
FIG. 18 illustrates an alternate welding jig in which the chamber is rotated relative to the electron beam.

As previously noted, during welding either the chamber can be rotated or the welding beam can be rotated about the chamber. Assuming the former, preferred, approach, one chamber half (e.g., 1601) can be held in a chuck 1603 connected to motor 1605 while the second chamber half (e.g., 1607) is held in a place by a freely rotating tail stock 1609 (FIG. 16). Alternately and as shown in FIG. 17, the freely rotating tail stock can be replaced with a freely rotating chuck 1701. Regardless, as the chamber is rotated, electron beam 1611 welds the two chamber halves together along chamber seam 1613. If each chamber half includes a through-hole 1801 located on the centerline as shown in FIG. 18, an alternate welding jig can be used in which the two chamber halves 1803/1805 are held together with an all-thread 1807 and compression nuts 1809. One end of all-thread 1807 is coupled to a motor 1811 while the second end of all-thread 1807 is held by a freely rotating member 1813. As in the previous jigs, the chamber is rotated relative to electron welding beam 1611. Preferably during welding the chamber halves are vertically positioned as shown in FIGS. 16-18, thus using the upper chamber's weight to press the mating surfaces together during welding. It should be appreciated, however, that vertical positioning, as shown, is not required during the welding process.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of fabricating a cavitation chamber comprising the steps:
   a) mounting a piece of stock material in a first lathe chuck;
   b) finishing a first mating surface of a first spherical cavitation chamber half;
   c) turning an internal spherical surface corresponding to an inside surface of said first spherical cavitation chamber half;
   d) turning a first portion of an external surface of said first spherical cavitation chamber half;
   e) dismounting said piece of stock material and reversing a mounting position of said piece of stock material relative to a first lathe chuck position;
   f) mounting said piece of stock material in a second lathe chuck;
   g) turning a second portion of said external surface of said first spherical cavitation chamber half;
   h) repeating steps a) through g) with a second piece of stock material to form a second spherical cavitation chamber half, said second spherical cavitation chamber half having a second mating surface, both said first and second spherical cavitation chamber halves having a first inner diameter and a first outer diameter;
   i) aligning said first and second mating surfaces; and
   j) electron beam welding said first and second mating surfaces together using an electron beam.

2. The method of fabricating the cavitation chamber of claim 1, wherein step b) is performed after step d).

3. The method of fabricating the cavitation chamber of claim 1, wherein step b) is performed after step g).

4. The method of fabricating the cavitation chamber of claim 1, further comprising the step of boring a through-hole in said first spherical cavitation chamber half, wherein said boring step is performed before step e).

5. The method of fabricating the cavitation chamber of claim 1, further comprising the step of boring a through-hole in said first spherical cavitation chamber half, wherein said boring step is performed after step g).

6. The method of fabricating the cavitation chamber of claim 1, wherein step d) is performed before step c).

7. The method of fabricating the cavitation chamber of claim 1, wherein said external surface of said first spherical cavitation chamber half has a first curvature, and wherein said step of mounting within said second lathe chuck further comprises the step of selecting a second lathe chuck with a plurality of jaws, wherein each jaw of said plurality of jaws has a holding surface with a second curvature matching said first curvature.

8. The method of fabricating the cavitation chamber of claim 1, wherein said first and second lathe chucks are the same.

9. The method of fabricating the cavitation chamber of claim 1, further comprising the step of selecting a stainless steel alloy for said piece of stock material.

10. The method of fabricating the cavitation chamber of claim 1, said electron beam welding step further comprising the step of rotating said first and second spherical cavitation chamber halves relative to said electron beam.

11. The method of fabricating the cavitation chamber of claim 1, said electron beam welding step further comprising the step of rotating said electron beam about said first and second spherical cavitation chamber halves.

12. The method of fabricating the cavitation chamber of claim 1, said aligning step further comprising the step of applying compressive force to said first and second spherical cavitation chamber halves.

13. The method of fabricating the cavitation chamber of claim 1, wherein said electron beam welding step is performed in vacuum.

14. The method of fabricating the cavitation chamber of claim 1, further comprising the steps:
   k) mounting at least one alignment pin in said first mating surface;
   l) boring at least one hole corresponding to said at least one alignment pin in said second mating surface; and
   m) aligning said at least one alignment pin and said at least one corresponding hole during said step of aligning said first and second mating surfaces.

15. The method of fabricating the cavitation chamber of claim 1, further comprising the step of coupling at least one acoustic transducer to said external surface.

16. A method of fabricating a cavitation chamber comprising the steps:
   a) mounting a piece of stock material in a lathe chuck;
   b) turning an internal spherical surface corresponding to an inside surface of a first spherical cavitation chamber half;
   c) forming a cylindrical end portion on said piece of stock material;
   d) dismounting said piece of stock material and reversing a mounting position of said piece of stock material relative to said lathe chuck;
   e) remounting said piece of stock material into said lathe chuck;
   f) turning an external spherical surface corresponding to an outside surface of said first spherical cavitation chamber half;
   g) removing excess stock material from said first spherical cavitation chamber half;
   h) finishing a first mating surface of said first spherical cavitation chamber half;
   i) repeating steps a) through h) with a second piece of stock material to form a second spherical cavitation chamber half, said second spherical cavitation chamber half having a second mating surface, both said first and second spherical cavitation chamber halves having a first inner diameter and a first outer diameter;
   j) aligning said first and second mating surfaces; and
   k) electron beam welding said first and second mating surfaces together using an electron beam.

17. The method of fabricating the cavitation chamber of claim 16, wherein step c) is performed before step b).

18. The method of fabricating the cavitation chamber of claim 16, further comprising the step of boring a through-hole in said first spherical cavitation chamber half, wherein said boring step is performed before step d).

19. The method of fabricating the cavitation chamber of claim 16, further comprising the step of boring a through-hole in said first spherical cavitation chamber half, wherein said boring step is performed before step i).

20. The method of fabricating the cavitation chamber of claim 16, further comprising the step of selecting a stainless steel alloy for said piece of stock material from an alloy.

21. The method of fabricating the cavitation chamber of claim 16, said electron beam welding step further comprising the step of rotating said first and second spherical cavitation chamber halves relative to said electron beam.

22. The method of fabricating the cavitation chamber of claim 16, said electron beam welding step further comprising the step of rotating said electron beam about said first and second spherical cavitation chamber halves.

23. The method of fabricating the cavitation chamber of claim 16, said aligning step further comprising the step of applying compressive force to said first and second spherical cavitation chamber halves.

24. The method of fabricating the cavitation chamber of claim 16, wherein said electron beam welding step is performed in vacuum.

25. The method of fabricating the cavitation chamber of claim 16, further comprising the steps:
   l) mounting at least one alignment pin in said first mating surface;
   m) boring at least one hole corresponding to said at least one alignment pin in said second mating surface; and
   n) aligning said at least one alignment pin and said at least one corresponding hole during said step of aligning said first and second mating surfaces.

26. The method of fabricating the cavitation chamber of claim 16, further comprising the step of coupling at least one acoustic transducer to said external surface.

* * * * *